United States Patent
Saunders

Patent Number: 5,946,499
Date of Patent: Aug. 31, 1999

[54] METHOD AND APPARATUS FOR PROCESSING TEXT INPUTS FROM MULTIPLE INPUT DEVICES IN A PLURALITY OF APPLICATIONS

[75] Inventor: William James Saunders, Mountain View, Calif.

[73] Assignee: Apple Computer, Inc., Cupertino, Calif.

[21] Appl. No.: 08/644,531

[22] Filed: May 10, 1996

[51] Int. Cl.[6] .................................................. G06F 13/14
[52] U.S. Cl. .............................. 395/893; 395/682; 707/5; 707/530
[58] Field of Search ................. 395/682, 893, 395/200.33; 707/5, 530

[56] References Cited

U.S. PATENT DOCUMENTS

| | | | |
|---|---|---|---|
| 5,243,149 | 9/1993 | Comerford et al. | 178/18 |
| 5,420,943 | 5/1995 | Mak | 382/313 |
| 5,500,920 | 3/1996 | Kupiec | 704/270 |
| 5,511,193 | 4/1996 | Tung et al. | 395/682 |
| 5,517,578 | 5/1996 | Altman et al. | 382/181 |
| 5,546,538 | 8/1996 | Cobbley et al. | 395/200.33 |
| 5,625,814 | 4/1997 | Luciw | 707/5 |
| 5,649,060 | 7/1997 | Ellozy et al. | 704/278 |
| 5,659,769 | 8/1997 | Kida et al. | 707/530 |
| 5,666,139 | 9/1997 | Thielens et al. | 345/175 |
| 5,687,254 | 11/1997 | Poon et al. | 382/229 |

OTHER PUBLICATIONS

Microsoft Press, "Computer Dictionary: the Comprehensive Standard for Business, School, Library, and Home", 2nd edition, Microsoft press, 1994, p. 24.

*Primary Examiner*—Thomas C. Lee
*Assistant Examiner*—Albert Wang
*Attorney, Agent, or Firm*—Sawyer & Associates

[57] ABSTRACT

A method, and system for supporting a plurality of textual manipulations and inputs in a computer system transparently to application programs running on the computer system, with the computer system including a text services manager, are described. A method aspect includes receiving inputs to the computer system, providing at least one text service event handler through the text services manager in response to the received inputs, and processing the received inputs with the at least one text service event handler to provide appropriate textual outputs from the at least one application program.

27 Claims, 4 Drawing Sheets

METHOD AND APPARATUS FOR PROCESSING TEXT INPUTS FROM MULTIPLE INPUT DEVICES IN A PLURALITY OF APPLICATIONS

FIELD OF THE INVENTION

The present invention relates to text processing in a computer system, and more particularly to processing of text inputs and manipulations from a variety of sources.

BACKGROUND OF THE INVENTION

Processing of text inputs into a computer system has many facets. Application programs typically handle keystroke entries from a keyboard, as well as selection of characters from a keyboard palette displayed on a display device through the use of a mouse or other pointing device. On-going technological improvements to computer systems have enhanced the methods for inputting data, including text, into computers. Such improvements include the ability to input text as handwriting, via a pen or stylus device. Another improvement includes the ability to input text captured as speech, via a microphone input device.

Improvements in text input devices, including word processing programs, have led to support of text input in several languages, including various non-English languages, such as Greek, Hebrew, Chinese, Japanese, etc. Typical keyboard input in such languages is normally performed using multiple keystroke commands. Although input efficiency of such languages is improved with the ability to use speech or handwriting input devices rather than multiple keystroke entry, processing inputs from these devices is typically more complex and thus not supported by most word processing programs.

In addition to supporting multiple languages, word processing programs often include stylistic aids to assist verification of character translations from one language to another. Further, linguistic aids, such as spell checkers, dictionaries, and thesauri, offer more assistance in checking accuracy and providing alternatives when inputting text.

Such linguistic and stylistic aids are usually quite helpful. However, these aids are normally limited for use within the word processing programs and are not easily transferable to other text input applications. Thus, not all application programs that utilize textual inputs, e.g., electronic mail programs, are capable of providing the enhanced capabilities these aids support.

Accordingly, a need exist for supporting the input of text from non-keyboard based devices and providing linguistic and stylistic assistance mechanisms for different types of text input programs. The present invention addresses such a need.

SUMMARY OF THE INVENTION

The present invention provides system and method aspects to support a plurality of textual manipulations and inputs and provide appropriate textual outputs. In one system aspect, the system includes at least one application program, and an operating system supporting operations of the at least one application program, the operating system comprising a text services manager for receiving data including text input events and linguistic aid events from a plurality of text input device formats through the at least one application program and providing a plurality of text service event handlers in response to the received data.

Additionally, the text input device formats include, but are not limited to, keyboard device formats, mouse device formats, stylus device formats, and microphone device formats. The text service event handlers include, but are not limited to, handwriting event handlers, speech event handlers, keyboard event handlers, and interactive event handlers.

In a method aspect, a method for supporting a plurality of textual manipulations and inputs in a computer system transparently to application programs running on the computer system, with the computer system including a text services manager, includes receiving inputs to the computer system. The method further includes providing at least one text service event handler through the text services manager in response to the received inputs. Additionally, the method includes processing the received inputs with the at least one text service event handler to provide appropriate textual outputs from the at least one application program.

The processing of received inputs includes determining if the received inputs are suitable for handling by the at least one text service event handler, wherein when the received inputs are not suitable for handling, the inputs are passed to the at least one application program. When the received inputs are suitable for handling by the at least one text service event handler, the method further includes determining whether the received inputs are one of a plurality of text input events, providing the received inputs to an appropriate text event handler when they are one of the plurality of text input events, and determining if the received inputs have been handled. When the events have been handled, the method further includes destroying the events.

In another system aspect, a system for supporting a plurality of textual manipulations and inputs in a computer system transparently to application programs running on the computer system includes at least one input device for sending inputs to the computer system, a text services manager for providing at least one text service event handler in response to the inputs, and an output device for providing appropriate textual outputs from the at least one text service event handler.

With the present invention, handling textual inputs from a variety of input devices readily occurs in different types of application programs processing text. Further, linguistic and stylistic aid mechanisms are also provided and available for use in a variety of application programs and are no longer limited to use within specific programs, such as word processing programs. Thus, improved functionality for inputting and manipulating textual data is readily achieved. These and other advantages of the aspects of the present invention will be more fully understood in conjunction with the following detailed description and accompanying drawings.

DETAILED DESCRIPTION

The present invention relates to formation and transformation of text inputs from a variety of input devices for a plurality of application programs. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
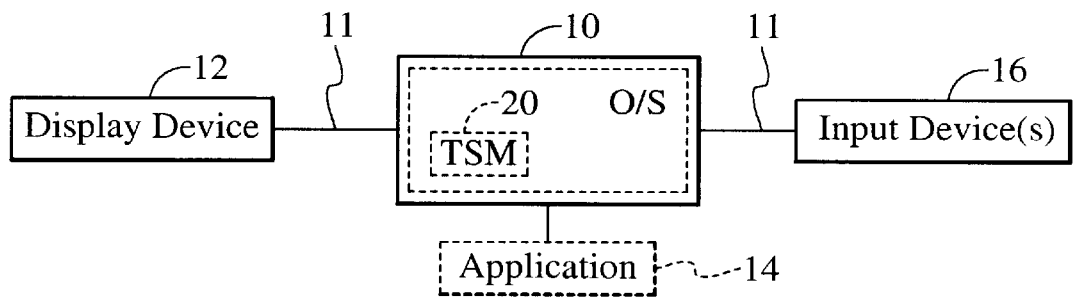
FIG. 1 illustrates a computer system environment in accordance with the present invention.

FIG. 1 illustrates a computer system environment in accordance with the present invention. Included in the system are a computer 10, the computer 10 including a central processing unit and an operating system, a display device 12 coupled to an input/output (I/O) bus 11, an application program 14, the application program 14 running on the computer 10, and user input devices 16, such as a mouse, keyboard, microphone, stylus, or other input device coupled to I/O bus 11. By way of example, FIG. 1 suitably represents an Apple™ Macintosh system.

In accordance with the present invention, the system of FIG. 1 receives text inputs from at least one of the input devices 16 for use in application program 14 and displayed on display device 12. For example, a user may input handwriting via a sensitive tablet (not shown) to the computer 10 for input into an application program 14, such as MacWrite™ from Claris Corporation. The coordination of text input processing suitably occurs with a text services manager (TSM) 20 included in the operating system of computer 10. Of course, the operating system including the TSM 20 need not be limited to single computers, but is suitably included in other computer system arrangements, such as client-server, Internet, or other arrangements, as may be desired.

The TSM 20 preferably controls interactions between text services and the application program 14. For purposes of this discussion, text services preferably refer to a class of functions that form or transform text. The functions belonging in the class include three categories: input methods, interactive text functions, and batch functions. For each input method, both keyboard and non-keyboard based, a text service preferably acts as a filter for input device events that are passed to an application program 14, thus intercepting entries of text and interacting with the user and application program 14 to convert raw events into a desired text stream. Each text service for interactive text functions, including such facilities as spell checkers, dictionaries, style checkers, and the like, preferably interacts with the user and on behalf of the application to perform an appropriate action on some portion of the text within the application. Batch functions, such as algorithms for performing proper hyphenation of words split across line boundaries within text documents, do not require handling by the TSM 20. Rather, an application uses batch functions to obtain direct, specific, linguistic processing of the application text, as is well appreciated by those skilled in the art.

An application program 14 preferably interacts with the TSM 20 with the creation of a data structure (TSMDocument) i.e., an opaque structure in memory that organizes related pieces of information, the basic types of which include files, lists, arrays, records, trees, and tables, as is well understood by those skilled in the art. The application program 14 further preferably performs operations, such as activate and deactivate, on the data structure, where activate suitably refers to activation of an input method and insertion of a menu for the TSM 20 into the application program 14 menu bar, while deactivate suitably refers to deactivation of an input method and removal of the TSM's menu from the menu bar for the application program 14.

Figure 2:
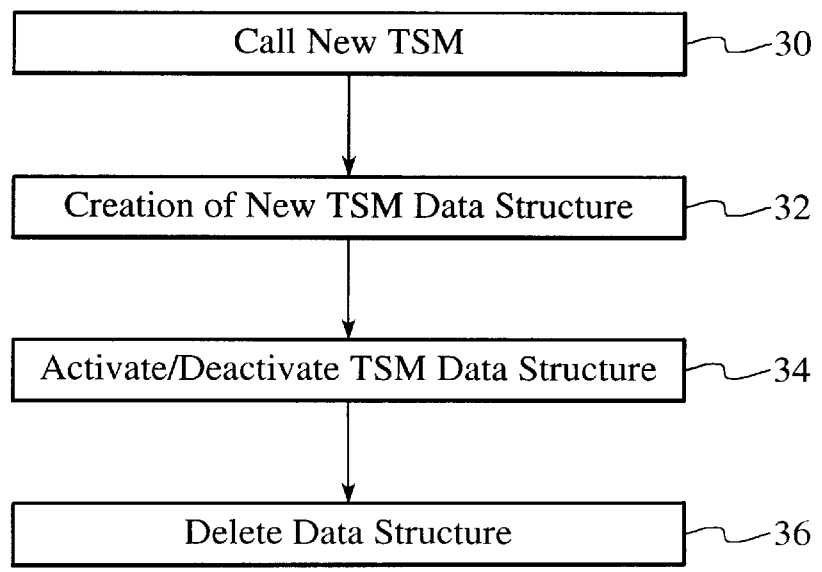
FIG. 2 illustrates a flow diagram of a first application program interface in accordance with the present invention.

FIG. 2 illustrates a flow diagram of a first application program interface ($API_1$) between an application program 14 and the TSM 20. As shown, upon the occurrence of an event to be handled by a text service, an application program 14 makes a call for a new data structure, e.g., TSMDocument, from the TSM 20 (step 30). In turn, the data structure TSMDocument is suitably created (step 32). Preferably, the data structure provides a high level interface to text services, and gives the application program 14 access to in-line processing of inputs. Further, preferably one data structure is created for each 'window', i.e., each document, of the application program 14.

Following creation of the data structure, the data structure is preferably activated upon activation of the window to which it corresponds and conversely deactivated upon deactivation of the window to which it corresponds (step 34). The data structure is suitably deleted from the computer system upon completion of the operations of the application program 14 (step 36) and/or destruction of the window.

Figure 3:
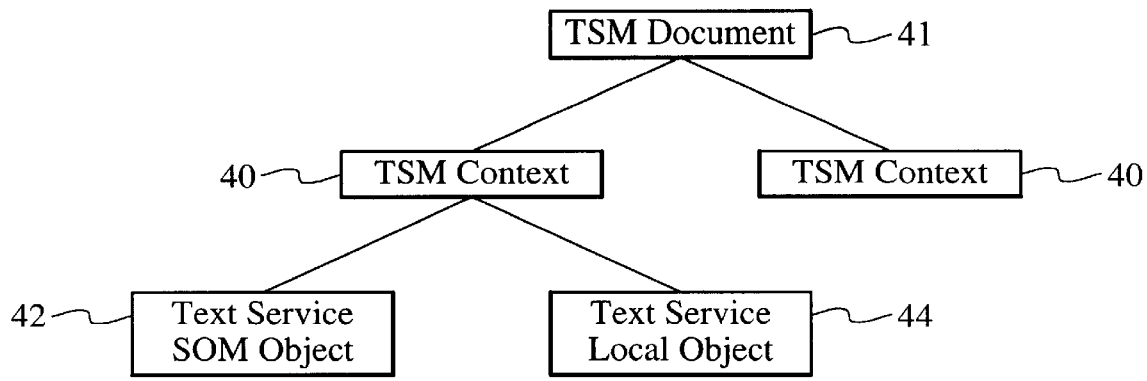
FIG. 3 illustrates a block diagram of a relationship among data structures in accordance with the present invention.

In terms of the TSM 20, the creation of the TSMDocument data structure initiates the creation of a second data structure 40, e.g., TSMContext, as shown by the diagram in FIG. 3. Preferably, there exists a second data structure, TSMContext 40, for each text service working on behalf of the application program 14. Each second data structure TSMContext 40 is suitably attached to the first data structure TSMDocument 41 and contains two pieces of information, a LocaleObject 42 and a SOM (system object model) object 44.

A LocaleObject 42 appropriately represents a text service and supplies the TSM 20 with the information necessary to load that text service, including a text service class used by the TSM 20 to access the text service and a SOM class name for the SOM class implemented by the text service, as is well understood by those skilled in the art. A SOM object 44 for the text service is created by the TSM 20 when the text service is created and is pointed to by the second data structure TSMContext 40. The SOM object 44 suitably provides methods necessary for interaction between the TSM 20 and the text service to which it refers. Although described as a SOM object, i.e., a mechanism created in accordance with SOM, from for example, IBM Corporation, New York, it is also suitably created and implemented using other languages, including C, C++, and the like, as is well appreciated by those skilled in the art.

Once the TSMDocument is activated, input events may be received and handled. Preferably, the application program 14 is unaware of the text services receiving and handling the events. Thus, a second API ($API_2$) suitably exists that initializes and activates the text services by the TSM 20. By way of example, the TSM 20 upon its activation, initializes each of the text services that would suitably handle events for the application program 14 that made the call for the new TSMDocument. Thus, the initialization of the text services allows the text services to become prepared for events, such as with the creation of windows, menus, etc., that the text service uses. Activation of the text services then proceeds upon activation of the TSMDocument, and the text services are ready to receive events.

Figure 4A:
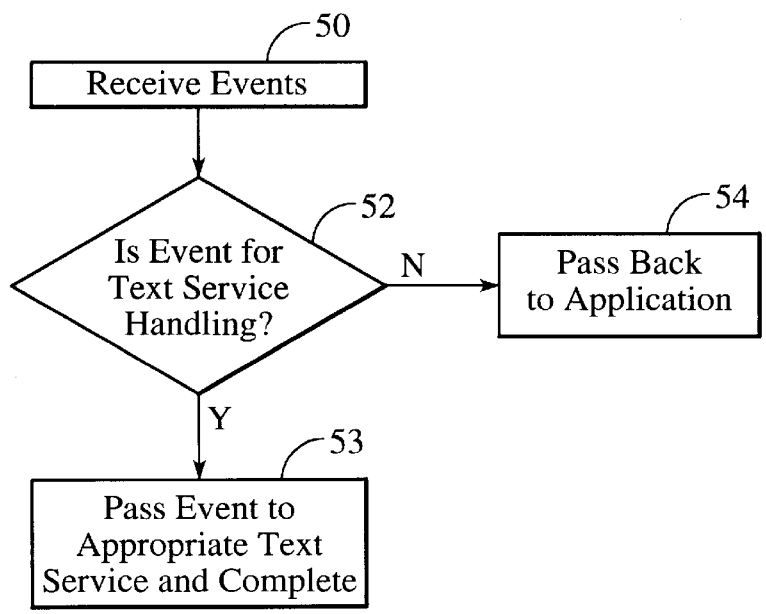
FIGS. 4a and 4b illustrate flow diagrams of an event handling routine in accordance with the present invention.
Figure 4B:
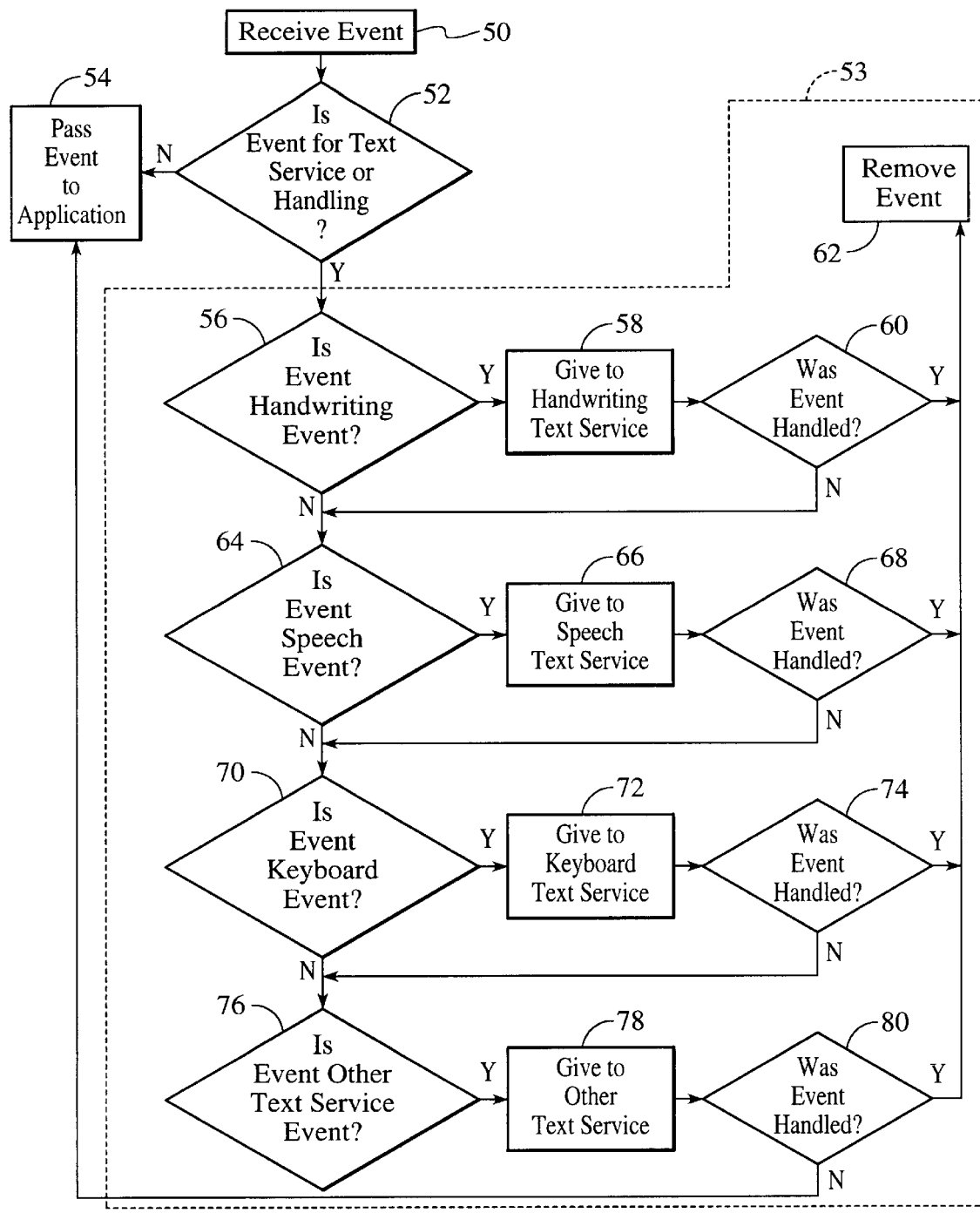

With the activation of text services, events, e.g., text input and modification, are suitably handled as illustrated in the flow diagrams of FIG. 4a and 4b. Processing initiates upon receipt of an event (step 50). In accordance with the present invention, the operating system preferably attempts to have each event handled by the TSM 20 first. Thus, a determination of whether the event is of a type suitable for handling by a text service is made (step 52). Events to be handled include, but are not limited to, key events, such as keystrokes on a keyboard, mouse events, such as mouse movements or tablet inputs, window events, such as events concerned with the user interface, and speech events, such as sound from a microphone. If the event is not one of the types that can be handled, the event is passed back to the application program 14 (step 54) for handling. If the event is one of the types that can be handled, the event is passed to an appropriate text service event handler and completed (step 53), as described in more detail with reference to FIG. 4*b*.

As shown in FIG. 4*b*, when the event is one of the appropriate types for a text service, the handling routine continues with a determination of whether the event was a handwriting event (step 56). If the event is a handwriting event, the event is passed to a text service for handling handwriting (step 58). If the event is completely handled (step 60), the event is removed from the system (step 62). For purposes of this discussion, the handling of handwriting or other events by a text service event handler are performed using well known handling routines, the details of which are readily available to those skilled in the art. For example, for handling a handwriting event a handwriting engine such as that utilized in the Newton product by Apple Computer could be utilized. In another example, an event handler for handling a speech event is a speech recognition engine such as "The Chinese Dictation Kit" by Apple Computer.

When the event is not completely handled by the handwriting text service or is not a handwriting event, a determination of whether the event is a speech event is made (step 64). When the event is a speech event, a text service for handling speech input receives the event for handling (step 66). Again, a determination of whether the event is completely handled is done (step 68), and when completely handled, the event is removed from the system (step 62).

When the event is not completely handled by the speech text service or is not a speech event, a determination of whether the event is a keyboard event is made (step 70). When the event is a keyboard event, the event is received by the text service for keyboard events (step 72). A determination of whether the event was completely handled is made (step 74), and if so, the event is completed and removed from the system (step 62).

When the event is not a keyboard event or is not completely handled by the keyboard text service, a determination of whether the event is another event for a text service, such as interactive events, including a spell check event, is made (step 76). When the event is for another text service, the event is handled by an appropriate text service, such as an interactive text service event handler, (step 78) and removed from the system (step 62). When the event is not another text service event or not handled by another text service, the event is passed back to the application program 14 (step 54). The process of handling events then continues upon receipt of a next event until deactivation occurs, such as when a window is closed, and is completely finished when the application program is terminated/exited.

It should be appreciated that although the determination steps 56 and 64 are described in a particular order, the order is arbitrary. Preferably, however, the determination for a keyboard event (step 70) occurs after steps 56 and 64, as this has been found to work well by the inventors.

Additionally, for purposes of this discussion, an event may not be handled by a particular text service even though taken by that text service. By way of example, a user may move/drag an open window for a text document with a mouse or other pointing device. Accordingly, a window event has occurred, which triggers an attempt by the TSM 20 to have a text service handle the event first. Since a text service may also have an open window displayed, window events could be aimed at the text service window and thus are passed for handling to a text service event handler. While such an event would satisfy step 52, the text service handler receiving the event may not actually need to handle the event, if the text service window is unaffected by the event. Since the text service handler receiving the event would not need to handle the event, the result of step 60, 68, 74, or 80 would be negative.

The handling of events as described with reference to FIGS. 4*a* and 4*b* preferably occurs transparently to the application program 14. However, a protocol suitably exists to allow communication between a particular text service and the application to facilitate event handling. The protocol suitably defines a type of behavior and 'verbs' that allow an interaction/dialog to occur. For a text service to interact with an application program 14, the application program 14 preferably presents an image of the text that is independent of the storage and structure of the application program 14. Thus, for example, a text storage model is suitably defined by the protocol as a flat stream of contiguous bytes ranging from 0 to 'n', 'n' being the total number of bytes in the text content. The application program decides how its storage structure is suitably mapped to the flat stream. In this way, text within footers, headers, etc., are included by the application program 14 in the flat stream of bytes for better usability by the text services.

With a contiguous text stream defined, the text service is suitably equipped to perform operations on any portion of the text. Each portion is preferably reserved before the text service can perform any operation on that portion. For each reserved portion, there exists an owner, a unique identifier, and a range. The owner suitably refers to the TSMContext of the text service creating the reserved portion. The unique identifier, as its name implies, is a value, e.g., a 32 bit value, supplied by the text service to uniquely identify the reserved portion. The range is preferably the set of bytes for the portion of the flat stream being reserved.

Figure 5:
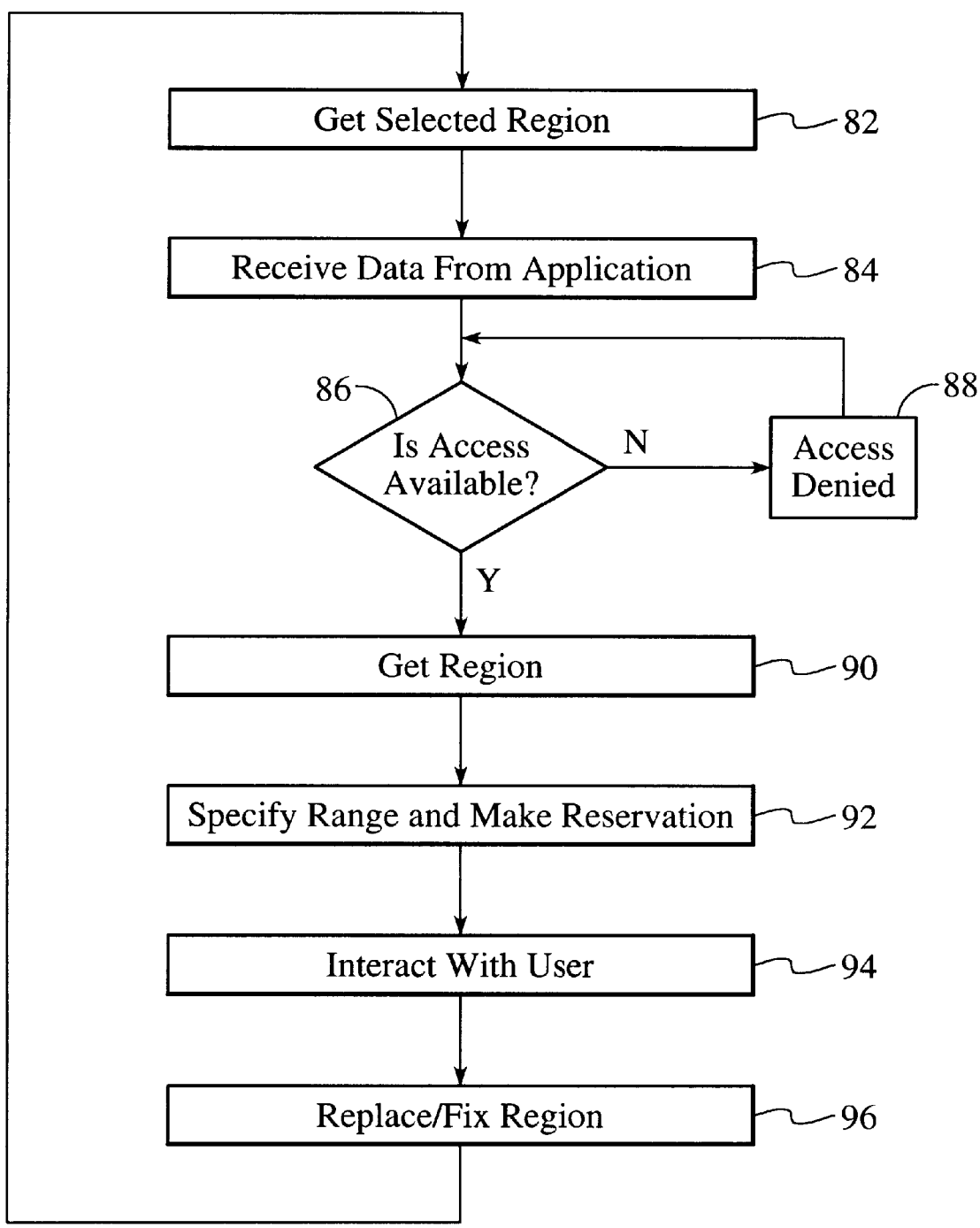
FIG. 5 illustrates an aspect for reserving a portion of text in accordance with a protocol of the present invention.

FIG. 5 presents a flow diagram of the process of making a reservation on a text portion by a text service. The process begins with a request for the retrieval of the selected portion of text (e.g., a paragraph, word, highlighted portion, etc.) from the application program 14 (step 82). Data for the specified portion is then received from the application program 14 (step 84). Preferably all text exchange between the text service and the application program is done with a text object, the text object being an opaque data structure storing the text. A text object that could be utilized for text exchange is described in U.S. patent application Ser. No. 08/435,393, entitled "Method and Apparatus for Managing Text Objects", filed on May 5, 1995 and assigned to the assignee of the present application. The application program preferably creates the text object with the text itself, the encoding of the text, and the language/region of the text.

Also received in the data from the application program is a reservation identifier to indicate whether access is available to the selected region (step 86), i.e., to figure out if there is another text service already operating on that portion of the text. If so, the access to that portion is denied (step 88) to ensure that there are no conflicts. Once the access is available, the text service receives the content for the desired region of the text (step 90). With the region obtained, the range for the region is identified and the reservation on that region is secured (step 92). By way of example, a reservation identifier having a non-zero value suitably indicates access is not available, while a zero value suitably indicates that access is available.

Once the text in the range is known, the text service is free to perform operations to change the content of the region. By way of example, the protocol supports an update region manipulation by the text service, such as performing a spell check on a particular region. Thus, for example, in performing a spell check on the text content, a misspelled word, e.g., 'tetx', is discovered and initiates an update region event. The appropriate text service suitably gets the range for the word, places a reservation on it, and interacts with the user (step 94) to determine the replacement, e.g., 'text'. The text service then appropriately sends an update event to change the content by specifying the range and changing the content (step 96) to 'text'. Once completed, the text service performs a 'fix' which suitably acts as a keyword event for removing the reservation of that portion of the text content. The process may then return to step 82 and continue with a next selected region, as desired.

In addition to getting a region or performing an update event, the protocol suitably also supports position to offset and offset to position operations. The position to offset operation preferably allows a text service to map a device dependent global position to an offset within the text. Conversely, the offset to position operation preferably allows a text service to map an offset within the text to a device dependent global position. These two events suitably allow text services to be completely independent from the manner in which the application program lays out the text and rather allows the mapping of changes to the device dependent location of the text. In addition, the protocol also suitably supports highlighting a region. By highlighting a particular region, a user's attention will be drawn to that region.

With the protocol and other aspects of the present invention, a system exists that provides transparent functionality for forming and transforming text in a variety of applications. The provision of a text services manager within the operating system in accordance with the present invention ensures that text input event handling is available to different application programs capable of taking advantage of such functionality. Thus, the processing of inputs from both keyboard and non-keyboard based input devices, as well as the supporting of manipulation aids, is efficiently achieved with improved flexibility.

Although the present invention has been described in accordance with the embodiments shown, one of ordinary skill in the art will recognize that there could be variations to the embodiment and those variations would be within the spirit and scope of the present invention. For example, the TSM and operating system could be implemented from programming instructions stored on a computer readable medium, such as a floppy disk. Accordingly, many modifications may be made by one of ordinary skill without departing from the spirit and scope of the present invention, the scope of which is defined by the following claims.

What is claimed is:

1. A system for supporting a plurality of textual manipulations and inputs to provide appropriate textual outputs, the system comprising:

at least one application program; and an operating system supporting operations of the at least one application program, the operating system comprising a text service manager for receiving data including text input events and linguistic aid events from a plurality of text input device formats through the at least one application program and providing a plurality of text service event handlers in response to the received data by directly initializing and activating the text service event handlers through the use of at least one application program interface.

2. The system of claim 1 wherein the text input device formats further comprise keyboard device formats.

3. The method of claim 1 wherein the text input device formats further comprise mouse device formats.

4. The method of claim 1 wherein the text input device formats further comprise stylus device formats.

5. The method of claim 1 wherein the text input device formats further comprise microphone device formats.

6. The system of claim 1 wherein the text service event handlers comprise handwriting event handlers.

7. The system of claim 1 wherein the text service event handlers comprise speech event handlers.

8. The system of claim 1 wherein the text service event handlers comprise keyboard event handlers.

9. The system of claim 1 wherein the text service event handlers comprise interactive event handlers.

10. A method for supporting a plurality of textual manipulations and inputs in a computer system transparently to application programs running on the computer system, the computer system including a text services manager, the method comprising:

receiving inputs to the computer system;

providing at least text service event handler through the text services manager in response to the received inputs by directly initializing and directly activating the at least one text service event handler through the use of at least one application program interface; and processing the received inputs with the at least one text service event handler to provide appropriate textual outputs from the at least one application program.

11. The method of claim 10 wherein the step of receiving inputs further comprises:

requesting a first data structure from the text services manager;

creating the first data structure; and performing activation and deactivation on the first data structure for assisting in input handling until inputs are no longer capable of receipt.

12. The method of claim 10 wherein the step of processing received inputs further comprises determining if the received inputs are suitable for handling by the at least one text service event handler, wherein when the received inputs are not suitable for handling, the inputs are passed to the at least one application program.

13. The method of claim 12 wherein when the received inputs are suitable for handling by the at least one text service event handler, the method further comprises determining whether the received inputs are handwriting events.

14. The method of claim 13 wherein when the received inputs are handwriting events, the method further comprises providing the received inputs to a handwriting event handler, determining if the handwriting events are handled, and removing the handwriting events when the handwriting events are handled.

15. The method of claim 14 wherein when the received inputs are not handwriting events or when the handwriting events are not handled, the method further comprises determining if the received inputs are speech events.

16. The method of claim 15 wherein when the received inputs are speech events, the method further comprises providing the received inputs to a speech event handler, determining if the speech events are handled, and removing the speech events when the speech events are handled.

17. The method of claim 16 wherein when the received inputs are not speech events or when the speech events are not handled, the method further comprises determining if the received inputs are keyboard events.

18. The method of claim 17 wherein when the received inputs are keyboard events, the method further comprises providing the received inputs to a keyboard event handler, determining if the keyboard events are handled, and removing the keyboard events when the keyboard events are handled.

19. The method of claim 18 wherein when the received inputs are not keyboard events or when the keyboard events are not handled, the method further comprises determining if the received inputs are interactive events.

20. The method of claim 19 wherein when the received inputs are interactive events, the method further comprises providing the received inputs to an interactive event handler, determining if the interactive events are handled, and removing the interactive events when the interactive events are handled.

21. The method of claim 20 wherein when the received inputs are not interactive events or when the interactive events are not handled, the method further comprises passing the received inputs to the at least one application program.

22. A system for supporting a plurality of textual manipulations and inputs in a computer system transparently to application programs running on the computer system, the system comprising:

at least one input device for sending inputs to the computer system;

a text service manager for providing at least one text service event handler in response to the inputs by directly initializing and activating the at least one text service event handler through the use of at least one application program interface; and an output device for providing appropriate textual outputs from the at least one text service event hander.

23. The system of claim 22 further comprising at least one application program running on the computer system for requesting creation of a first data structure from the text services manager in response to the inputs, and for performing activation and deactivation on the first data structure to assist in input handling until inputs are no longer capable of receipt.

24. The system of claim 22 wherein the at least one input device inputs key events, mouse events, and window events for handling by the at least one text event handler.

25. The system of claim 24 wherein the at least one text event handler handles at least one of the group of input events consisting of speech events, handwriting events, keyboard events, and interactive events.

26. The system of claim 25 wherein the application program handles events not handled by the at least one text event handler.

27. A computer readable medium containing program instructions for:

receiving inputs to a computer system;

providing at least one text service event handler through a text services manager in response to the received inputs by directly initializing and activating the at least one text service event hander through the use of at least one application program interface; and processing the received inputs with the at least one text service event handler to provide appropriate textual outputs from at least one application program.

\* \* \* \* \*